United States Patent [19]

Weeks

[11] Patent Number: 4,580,927
[45] Date of Patent: Apr. 8, 1986

[54] PNEUMATIC MATERIAL TRANSPORTATION APPARATUS

[75] Inventor: Wyatt Weeks, Houma, La.

[73] Assignee: Pnu-Tank, a division of Gulf Island Industries, Houma, La.

[21] Appl. No.: 546,595

[22] Filed: Oct. 28, 1983

[51] Int. Cl.$^4$ .................. B65G 53/66; B65G 53/46
[52] U.S. Cl. ........................... 406/50; 406/85; 406/119; 406/131
[58] Field of Search .............. 406/50, 85, 118, 119, 406/131

[56] References Cited

U.S. PATENT DOCUMENTS

| | | | |
|---|---|---|---|
| 3,115,369 | 12/1963 | Bozich | 406/125 X |
| 3,734,569 | 5/1973 | Vingas | 406/118 |
| 4,061,401 | 12/1977 | Brown | 406/128 |
| 4,420,279 | 12/1983 | Easley, Jr. | 406/50 |

Primary Examiner—Jeffrey V. Nase
Assistant Examiner—MaryBeth O. Jones
Attorney, Agent, or Firm—Keaty & Keaty

[57] ABSTRACT

A pneumatic material transportation apparatus utilizes a continuous supply of particulate material which is fed to an open hopper, and flows by gravity through a pneumatic sealing feed valve into a pulse drive chamber containing a series of internal gravity flow chambers. Near simultaneous timed pulses of compressed air applied to the upper and lower portions of the drive chamber forces the feed valve to a closed position. The air fluidizes the particulate material, and drives the material from the upper end of the internal gravity flow chambers through a lower drive passage and outlet check valve into a pneumatic transport line. Cessation of the air pulse reduces the pressure within the chamber to ambient. The outlet check valve is forced closed and the inlet feed valve opens, thereby admitting more particulate material and resuming the cycle. A plurality of drive chambers can be combined beneath the filled open hopper so that alternating pulses permit a continuous flow of material to the pneumatic transport line. Varying the duration of the pulse alters the travel distance of the material.

8 Claims, 4 Drawing Figures

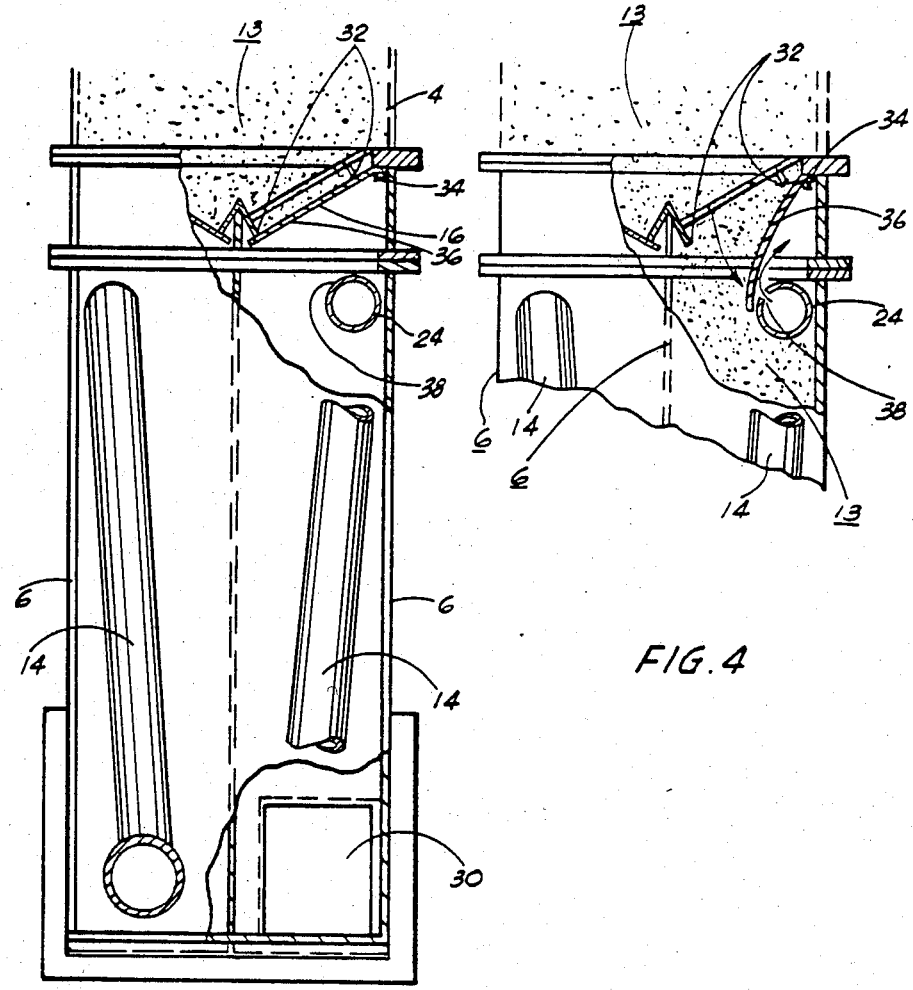

PNEUMATIC MATERIAL TRANSPORTATION APPARATUS

BACKGROUND OF THE INVENTION

This invention relates to the area of pneumatic transportation of particulate or granular material. It has become common to design bulk material handling systems for handling particulate or granular materials by using compressed or pressurized air or gas to move the material through pipes. This technology is based upon the fact that such materials when exposed to a gas at an elevated pressure become aerated up by the gas which penetrates throughout the material and converts it from a solid to a fluid mass having many of the characteristics of a liquid. This process is referred to as fluidizing the material and permits it to be transported for a distance through pipes as though the material were a liquid.

It is of course well known, that as the pressure drops within the material, the individual particles settle out and the material falls out of the stream of gas forming piles. This is much the same phenomenon as results in sand dunes in a desert; it limits the distance to which the material can be moved and also puts outer limits on the speed and mass of material that can be moved with a given unit of air.

This technology has led to the development of various pressurization systems within the field of pneumatic material handling. One of the essentials for fluidizing the material to be handled is that it be pressurized; that is, it is exposed to a gas at a pressure well above normal atmospheric pressure. As a result, the existing state of the art requires that the material to be handled be moved into a pressure vessel which is then sealed and pressurized to provide the essential fluidization.

These pressure vessels thus result in all current pneumatic material handling systems being essentially non-continuous flow. A batch of material must be accumulated and then in turn transported into an enclosed pressure vessel. No further material can be put into the pressure vessel until all material within the pressure vessel has been transported. The pressure vessel may then be refilled. This results in a requirement for at least two holding units, including the pressure vessel, and an interruption in the flow of the material. It severely complicates the construction of material handling facilities, most of which are fed by continuous flow means.

It also makes pneumatic handling systems unsuitable for certain flow critical material handling systems. One such is in cement plants. Continuous flow of the cement is essential, as kiln startup and shutdown for batch flow is infeasible due to the thermal load imposed by startup and shutdown. As a result, alternate, less efficient material flow systems are used, largely based on pressure-tight screw-feed mechanisms.

In addition, within a given pneumatic system the physical design of the system determines its range, the distance to which the material can be transported. Previous attempts to overcome range restrictions have been in the form of introducing, at periodic intervals along the transportation pipe, points at which additional compressed air can be introduced into the flow of material. However, even with this improvement, it has remained that for a given physical design the distance to which the material being handled can be transported is essentially a constant, fixed by the design of the system and not variable by its subsequent operational conditions.

The above restriction is largely due to the fact that the fluidization of the material is a function of the initial feed pressure vessel design. This feed pressure vessel is of such a large size, in order to achieve a reasonable material movement rate, that it essentially determines the volume and pressure of the pneumatic gas feeds to be provided to the overall system and thus controls the characteristics of the pneumatic material transportation system.

SUMMARY OF THE INVENTION

The current invention is a novel apparatus combining an open continuous feed bin material handling system and a pneumatic transportation system. The invention essentially consists of a series of unique, gravity fed pneumatic drive chambers which cycle, under control of an external pneumatic air feed, between gravity fill from the continuous supply system and pulsed pneumatic injection of a unit of material into a pneumatic material piping system.

A plurality of such chambers may be arranged as a manifold and fed in alternating sequence from a central source of pneumatic air. The size of any one individual chamber is such that practical pneumatic feeds can fluidize and transport varying materials for varying distances and it is feasible to control the distance through which the material can be transported by variations in the parameters of the pneumatic drive air pulse.

Thus it becomes practical, for the first time, to design a pneumatic material handling system which can feed a variable length flow path allowing the material to be switched between varying lengths of pipe to varying destinations or alternately allowing the use of various forms of intermediate feed or delivery pipes which have the capability of being extended or retracted to move the delivery point to among various locations.

It is also possible to temporarily extend the length of the delivery as would be required to handle certain unique shipping operations such as may be encountered in a shoreside or dockside loading situation where materials are transmitted by the pneumatic handling system from one mode of transportation to another, such as a ship.

It is thus an object of this invention to provide a pneumatic material handling system which is capable of being fed from a continuous source of material and which does not require discreet batching of this material.

It is a further object of this invention to provide a pneumatic material handling system which has the capability that the distance the material is transported, and the flow rate of material being transported may be varied by controlling the characteristics of the pneumatic feed air, and where the ability to vary these characteristics, is over a usable range, independent to the physical construction of the pneumatic system.

It is a further object of this invention to provide a means of transporting material pneumatically over a longer distance for a given air supply than heretofore has been possible.

It is a further object of this invention to provide a continuous flow, pressurized, particulate material handling system which requires considerably less energy to move a unit of material.

These and other objects of the invention will be more readily apparent from the detailed description of the embodiment hereinafter set forth and from the claims.

DETAILED DESCRIPTION OF THE DRAWINGS

FIG. 3 is a cutaway end view of the pneumatic drive chamber showing the material feed valve in a closed position.

FIG. 4 is a detailed cutaway showing the material feed valve in an open position.

DETAILED DESCRIPTION OF THE PREFERRED EMBODIMENT

Figure 1:
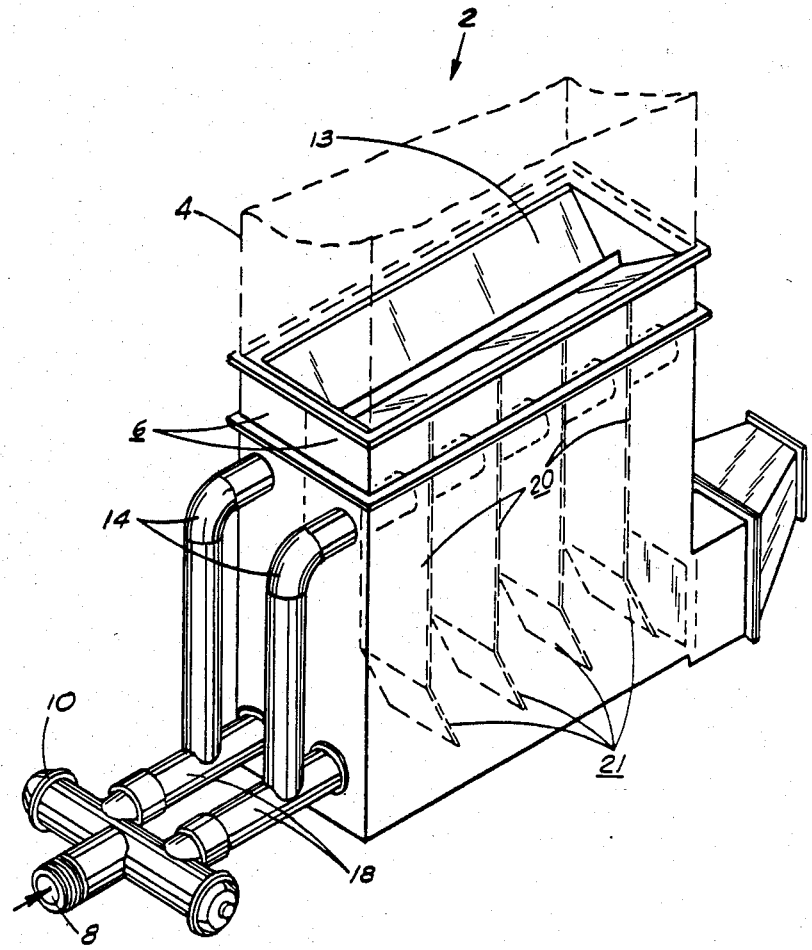
FIG. 1 is a view of the overall pneumatic material transportation apparatus.

FIG. 1 shows the overall pneumatic drive system 2, which in its basic preferred embodiment comprises a bulk material hopper 4 designed to receive and hold a continuous flow of material 13 to be transported through means of the pneumatic material drive system 2.

Located underneath bulk material hopper 4 in a position for gravity feed of material 13 is pulse pneumatic drive chamber 6. In this particular example, there are two pulse pneumatic drive chamber 6 mounted side by side. The pneumatic air pressure to drive the material throughout the system 2 is provided through a pneumatic air supply manifold 8 which is connected to a standard air supply such as an air compressor or compressed gas supplies, all well known to those shown in the art and not shown here.

A pulse or air control valve 10 is provided. It is connected to a controller mechanism, not shown, as it may be any design known in the art, and provides pulses of compressed air to the pneumatic drive sources 18. These sources 18 are 2 pipes, acting as sources of controlled pneumatic air to the pneumatic drive chamber 6. Arising from the drive source 18 is an upper pneumatic piping 14, arising generally to the top of the pneumatic drive chamber 6 as will be discussed in more detail below. The upper pneumatic piping 14 is seen to enter the drive chamber 6 and connect to an upper fluidizing pipe 24.

Figure 2:
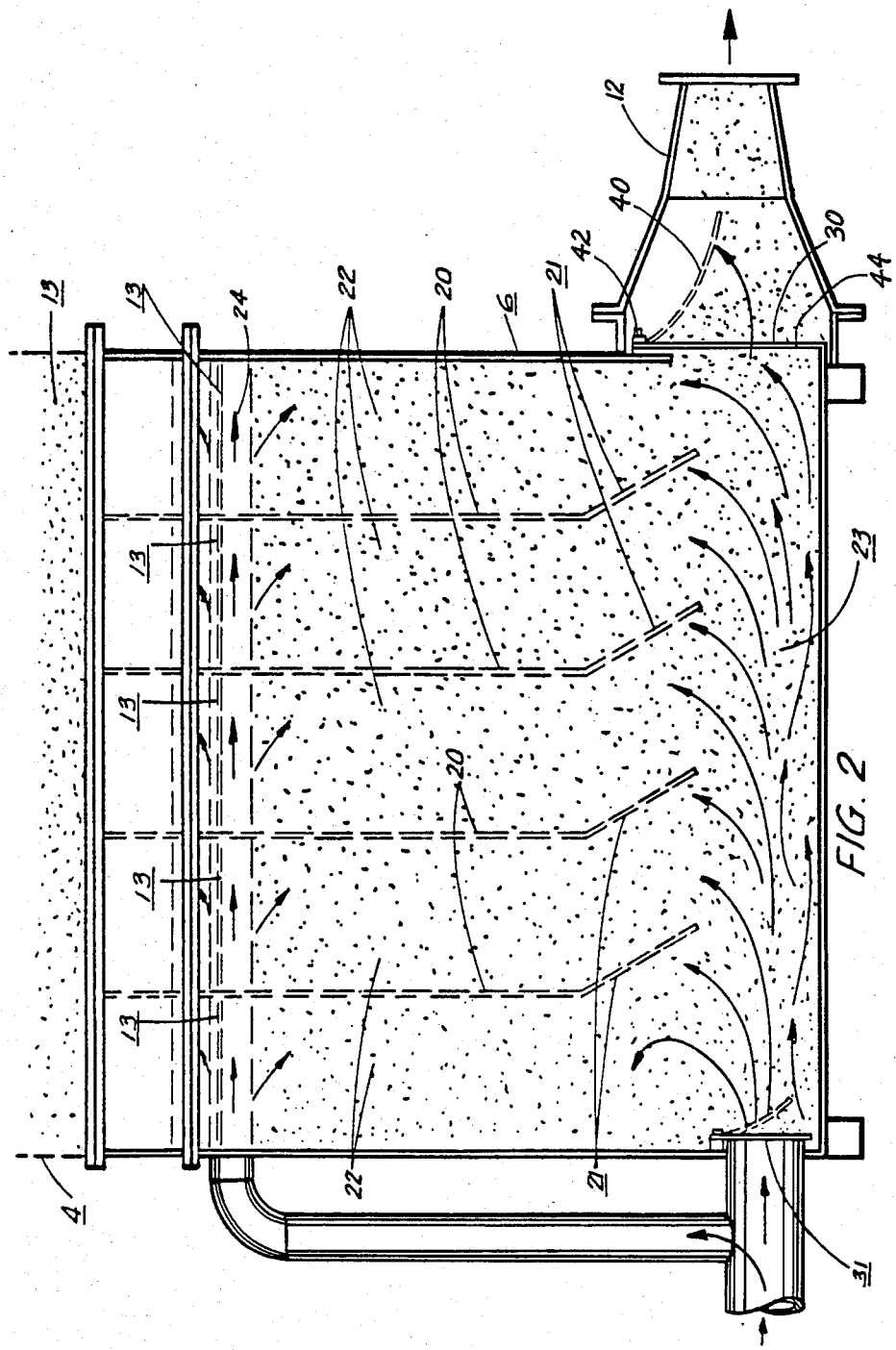
FIG. 2 is a side view of the pneumatic drive chamber.

Turning to FIG. 2 in conjunction with FIG. 1, it can be seen that the pneumatic material drive system 2 holds and transports material 13. Material 13 is any of a number of particulate or granular materials normally transported by pneumatic means; these are alternatively referred to as incoherent materials. In the preferred embodiment of this invention, they can be materials as diverse as food grains and as cement.

The material 13 is accumulated in a hopper 4 and is fed by gravity feed into the pneumatic drive chamber 6 through a series of material feed valves 16. The design of these feed valves 16 will be discussed in more detail later. It is important to note that they are designed to permit gravity feed of the particulate material in a non-fluidized state. That is the material 13 is not under the influence of pneumatic air pressure when it is being fed into chamber 6.

A material flow outlet 12 is provided for feeding the pneumatically driven material 13 as will be hereinafter described, to a standard design material flow piping system, as is well understood in the art of pneumatic material handling.

Within drive chamber 6 are found a series of bypass preventing drive chamber baffles 20 which divide the interior of the chamber into a series of closed, drive chamber, vertical flow sections 22 extending from the top of drive chamber 6 adjacent to the material feed valving 16; these baffles 20 close off the interior of the drive chamber into multiple sections 22. In the preferred embodiment, each of the individual drive chamber baffles 20 is provided with a lower baffle section 21 which, as can be seen, is angled in the preferred direction of flow of the material 13 in the system. The construction of the baffles 20 is such that the drive chamber vertical flow sections 22 do not communicate with one another.

The lower baffle sections 21 reduce the passage area between a pneumatic inlet, 31 and the material flow outlet 12 to form a restricted flow area, preventing flow around or by passing by the drive pneumatic air of the material 13.

Connecting from upper pneumatic piping 14 and extending on the interior of the drive chamber 6 through the individual drive chamber baffles 20 within each of the drive chamber vertical flow sections 22 is an upper fluidizing pipe 24. This pipe 24, as will be described in more detail below, is located at a particular position with respect to the material feed valving 16 which comprises the top of the drive chamber 6.

The main pneumatic drive source 18 connects directly to a lower drive inlet 31 providing thereby through an inlet check valve, not shown and of standard construction, flow of pneumatic or compressed gas for driving the material 13 within the pneumatic drive system 2.

The drive chamber baffles 20 terminate at a uniform point within drive chamber 6, a distance off the bottom of the drive chamber 6 forming thereby a continuous through passage within drive chamber 6 between the lower drive inlet 31 and the pneumatic material flow outlet 12. This region, the material drive region 23, is the only communication between the individual drive chamber vertical flow sections 22.

Material flow outlet 12 is seen to comprise in more detail an outlet check valve 30. The outlet check valve 30 further comprises an outlet elastomeric flap 40 mounted on a outlet flap pivot 42 so as to freely pivot between a closed and an open position. In the closed position, the elastomeric flap 40 is suspended from the pivot 42 against an outlet valve seal frame 44 which provides a raised rim metal to elastomeric seal around the outer periphery of the overall outlet check valve 30.

Turning to FIG. 3 and FIG. 4 which show in some detail the construction of the material feed valving 16 it is seen that the material feed valving 16 comprises in detail an elastomeric flap 36 mounted, as is the entire valve 16, at an angle to the bottom of feed hopper 4. This angle has an upper end where the elastomeric flap 36 is pivoted at upper end pivot 34. When closed, the elastomeric flap 36 seals against the feed valve support frame 32. The feed valve support frame 32, in its simplest form, is simply a continuous, raised metal edge meeting the outer periphery of each of the elastomeric flaps 36 providing a tight elastomeric to metal edge seal when the elastomeric flap 36 is held against the seal frame 32 by pressure.

The construction of both elastomeric flap 36 and outlet elastomeric flap 40 is of a reinforced elastomer design. Each flap has a stiffening material embedded within it so as to make it resistant to bending and collapse failure under the back pressures to be encountered within the overall pneumatic drive system 2. In this embodiment, the reinforcement is a metal plate enclosed between two outer elastomeric layers; an alternate embodiment is a rigid plastic plate between two compatible outer layers.

In FIG. 4 the elastomeric flap 36 is shown in its normal condition when there is no pressure within drive chamber 6 and the material 13 within hopper 4 is, by the force of gravity, pushed down against the material valve 16. Under these conditions the elastomeric flap 36 pivots downward and comes to rest against upper fluidizing pipe 24 which is positioned within chamber 6 so as to be contacted by an edge of elastomeric flap 36 opposite the pivot 34 when elastomeric flap 36 is in its most downward position, the open position. At the point where elastomeric flap 36 contacts upper fluidizing pipe 24 are provided, in pipe 24, a series of elongate fluidizing pipe flow outlets 38, communicating between the interior of the upper fluidizing pipe 24 and the interior of the drive chamber 6. The overall construction of the elastomeric flap 36, as part of the construction of the overall valve 16, and the fluidizing pipe 24 with its fluidizing pipe flow outlets 38 is such that when the elastomeric flap 36 is in the downward or open position it sealingly covers the fluidizing pipe flow outlets 38.

As can be readily understood by those skilled in the art the design of the valve 16 is such that upon any material 13 being introduced into hopper 4 it will by the force of gravity flow through the open valve 16, which is opened by gravitational forces on elastomeric flap 36 and fill pneumatic drive chamber 6. This process will continue until such time as so much material 13 has been introduced into the hopper 4 as to rise past the height of the material feed valving 16 thus substantially filling the pneumatic drive chamber 6.

To operate system 2, the drive chamber 6 is cycled between two conditions.

The first condition is established when no pneumatic air is supplied through the pneumatic drive source 18 to the drive chamber 6. In this condition, as has been said, material 13, provided into bulk material hopper 4, flows by gravity through the open material feed valving 16, which is maintained in an open state both by the force of gravity and the material 13. This flow continues until the bulk material hopper 4 is emptied of material 13 or alternately until the material rises above the level of the material feed valving 16.

By means of control signals appropriately applied to the pneumatic and air control valve 10, a suitably long pulse of pressurized gas or air is provided from the pneumatic air supply manifold 8 to the pneumatic drive source 18 connected to the drive chamber 6. At this point there are two, nearly simultaneous, effects.

The first is that the pulse of pressurized air is transmitted through the upper pneumatic piping 14 into the upper fluidizing pipe 24. The upper fluidizing pipe 24 uniformly distributes this compressed air throughout the length of the drive chamber 6, evenly and equally to each of the sections of the upper fluidizing pipe 24 within each of the drive chamber vertical flow sections 22. In each of the vertical flow sections 22 on a nearly simultaneous basis, the force of the compressed air through the fluidizing pipe flow outlets 38, against the elastomeric flaps 36, causing the compressed air to flow out of the flow outlets 38 around the flap 36.

This air within the material 13 causes a process known as fluidizing; that is it converts the material 13 from its normally static particulate state to a flowable state approximating that of a viscous fluid. The pressure of the air against the lower regions of the flap 36 causes the flap 36 to be pushed against the now fluidized material 13 until the flap 36 is closingly and sealingly pressed against the feed valve support frame 32. At this point, the hopper 4 is isolated from the drive chamber 6 by the pressure of the compressed air coming through the fluidizing pipe 24, and drive chamber 6 is now a functioning pressure chamber. The material within drive chamber 6 is now fluidized and now the increasing pressure starts to drive the material downward through each of the vertical flow sections 22.

Simultaneously, the compressed air is provided into the drive chamber 6 at the material drive region 23 by flow through the pneumatic drive source 18 into the drive chamber 6 through lower drive inlet 31. Again, the presence of the compressed air under pressure fluidizes the material 13 found within the drive chamber 6, causing it to flow as a viscous fluid. The location of the baffle lower sections 21 and their spacing from the bottom of the drive chamber 6 is such that the compressed gas does not pass around the material 13 found in drive region 28 but rather forces the material 13 found within the lower material drive region 28 to flow against the outlet check valve 30.

The pressure within drive chamber 6 rises to greater than the pressure within material flow outlet 18. The outlet elastomeric flap 40 is then projected in an upward displaced direction permitting flow of the material out of the drive chamber 6 and into the outlet 18. This flow continues until each of the drive chamber vertical flow sections 22 is emptied of material 13; the residual material 13 within the material drive region 23 is then propelled outward by the residual compressed air flow through lower drive inlet 31. The spacing of the individual lower baffle sections 21 from the bottom of the drive chamber 6 is such that essentially no air bypasses the residual material 13, and the drive chamber 6 is essentially, totally emptied.

The flow of compressed gas and material 13 causes the pressure within the pneumatic drive source 18, the chamber 6, and the flow outlet 12 to equalize. The design of outlet check valve 30, with its rigid flap 40 pivotly installed at pivot 42 causes it to close upon equalization of the pressure.

An inlet check valve 31, of identical construction to outlet valve 30, likewise closes off lower drive inlet 31. At this point chamber 6, being sealed at all valves, is pressurized to the working pressure of the flow outlet 12. It is necessary to dump this pressure, which is conveniently done by opening control valve 10 to ambient pressure, causing chamber 6 to exhaust through fluidizing pipe outlets 38, thence via fluidizing pipe 24, upper piping 14, drive source 18, and control valve 10.

At this point, the control means terminates the supply of compressed air through the air control valve 10 to the pneumatic drive source 18, and exhausts the chamber 6 pressure as stated above, resulting in a drop in pressure within drive chamber 6 towards ambient pressure at the point where the pressure within chamber 6 drops below the weight of the residual material 13 within hopper 4, one or more of the material feed valve 16 will open against the weight of the material, releasing all residual gas pressure and starting the cycle again.

Thus it can be seen that each of the pneumatic drive chamber 6 is operated in a cyclical pulse flow, driven by the supply of pressurized air or pressurized gas, controlled by means of the pulse and air control valve 10. Such a valve may be any of the cyclical on and off shuttle valves well known in the art of compressed air handling. Likewise, the control means for controlling the pulses can be any standard timed or electrical pulser which may be set to a duration as desired for the movement of the material through the pneumatic handling system.

It is found that full capabilities of the drive chamber 6 can be best employed when more than one drive chamber 6 is located, as for instance as is shown in FIG. 3, under a given hopper 4. This permits the use of a reciprocating effect where one drive chamber 6 is being pressurized and emptied while another drive chamber 6 is filling through the force of gravity. This provides an increased pulse flow rate of material 13 through the material flow outlet 12 and into the downstream pneumatic delivery material tubing.

It has been found that the overall volume of the drive chamber 6 in comparison to the practical gas delivery capabilities of known pneumatic air supply manifolds 8 is such that it is possible to vary the amount of gas pressure provided to the material 13 over a fairly wide margin. This has not heretofore been possible with a very large pressurized vessels required to achieve usable material flow rates within pneumatic material handling systems. As a result it is possible to design and operate a plurality of drive chambers 6 so as to vary the distance the the material will travel when it is injected through the outlet 12 into standard pneumatic material flow piping. It has been found, for instance, that by increasing the duration of the air pressure pulse that the material 13 will travel a further distance, that is the material 13 will retain its fluidized characteristics longer. This permits the redesign and extension of existing pneumatic material handling system 2 over a fair range of tolerance without the necessity of adding additional drive sections as has been required in the previous art.

It is also found that, inasmuch as hopper 4 is at all times at ambient pressure, hopper 4 can receive material 13 from a continuous supply source. This allows a continuous supply of material 13 to be interfaced into a pneumatic drive system in a matter heretofore impossible, since the prior art has required the use of fairly large pressure vessels. Such vessels must be filled and then the flow of material stopped until the pressure vessel has been blown into the pneumatic system. As a result, the particular invention shown here is capable of being designed into material handling systems of a far wider range of functions than heretofore has been possible; it is specifically suggested that this invention is capable of supporting such demanding tasks as cement feed within a cement plant, a function not now supportable by prior art pneumatic systems.

It can be seen that the invention as described is susceptible of a far wider range of equivalents than the specific implementation described as the preferred embodiment, and the invention as claimed is not just the specific implementation described above but rather that wider range of equivalents as is implied by the claims to follow.

I claim:

1. An apparatus for pneumatic movement of incoherent material into a pneumatic material transportation system, comprising:
    a. a means for providing a pressurized fluid flow;
    b. a pneumatic drive chamber in fluid communication with said means for providing a pressurized fluid flow, said chamber having a lower and upper regions;
    c. means for admitting the incoherent material, by gravity, into said chamber said means comprising a material introduction flap valve;
    d. means for introducing the pressurized fluid into the chamber disposed in the lower and upper regions of the chamber, the pressurized fluid being introduced into the upper chamber through a conduit, substantially traversing the length of the upper region of the pressurized chamber, said conduit being provided with a plurality of pressurized fluid outlets, said conduit being adjacent said material introduction flap valve wherein said material introduction flap valve is movable between a closed position when the fluid is being introduced into the chamber, and an open position when the material is being introduced into the chamber;
    e. means for cyclically isolating said means for introducing pressurized fluid flow in the lower region of the chamber from the pressurized fluid flow, said means comprising a flap valve;
    f. a plurality of verticaly oriented baffles mounted in spaced relationship within the chamber to form a plurality of flow chambers, said baffles extending vertically downward from the upper region of the chamber to a point distant from the bottom of the chamber, each of said flow chambers being provided with at least one of said pressurized fluid outlets in adjacent relationship to the material introduction flap valve, the material introduction flap valve being in protectively covering relationship to the fluid outlets when the material introduction flap valve is in the open position;
    g. means for allowing extrusion of the incoherent material from said chamber.

2. The apparatus of claim 1, where each baffle is further provided with a lower section angled in the direction of fluid flow within the chamber, the distance between the lower edges of the baffles and the bottom of the chamber defining a material movement section.

3. The apparatus of claim 1, wherein said means for allowing extrusion of the incoherent material from the chamber further comprises an outlet check valve means, adapted to operate in response to the change of pressure within the chamber.

4. The apparatus of claim 3, wherein the check valve means is a flap valve.

5. The apparatus of claim 1, wherein the openings in the conduit are oriented to direct pressurized fluid between the baffles in the chamber.

6. An apparatus for pneumatic movement of incoherent material into a material transportation system, comprising:
    a source of pressurized fluid;
    a pneumatic drive chamber in fluid communication with the source of pressurized fluid, the chamber having an upper region and a lower region, the pressurized fluid being introduced into the upper region through a conduit substantially traversing the length of the upper region of the chamber, the conduit having openings through which the fluid is introduced, the pressurized fluid being also introduced through an inlet adjacent the bottom of the chamber, the inlet being provided with a flap valve movable between an open position when the fluid is being introduced through the inlet and a closed position when the material is being introduced into the upper region of the chamber;

a plurality of flap valves mounted in the upper region of the chamber, the valves being movable between a closed position not allowing material to be introduced into the pressurized chamber, and an open position in covering relationship to the openings in the conduit in the upper region of the chamber, when the material is being introduced into the pressurized chamber;

means for admitting the incoherent material, by gravity, into the upper region of the chamber;

a plurality of baffles vertically oriented in spaced relationship within the pressurized chamber, the baffles forming a plurality of flow chambers therebetween, the bottom edges of the baffles and the bottom of the chamber defining a material movement section, the conduit being in fluid communication with said plurality of flow chambers through the outlets in the conduit; and an outlet for allowing extrusion of the incoherent material from the pressurized chamber.

7. The apparatus of claim 6, wherein each baffle being further provided with a lower section angled in the direction of the outlet.

8. The apparatus of claim 6, wherein the openings in the conduit are oriented to direct air between the baffles into the chamber.

* * * * *